(12) United States Patent
Nyenhuis et al.

(10) Patent No.: US 6,169,773 B1
(45) Date of Patent: Jan. 2, 2001

(54) SYSTEM FOR SYNCHRONIZING A BLOCK COUNTER IN A RADIO-DATA-SYSTEM (RDS) RECEIVER

(75) Inventors: Detlev Nyenhuis, Sibbesse; Wilhelm Hegeler, Hildesheim, both of (DE)

(73) Assignee: Blaupunkt-Werke GmbH, Hildesheim (DE)

(*) Notice: Under 35 U.S.C. 154(b), the term of this patent shall be extended for 0 days.

(21) Appl. No.: 09/000,267
(22) PCT Filed: Jul. 9, 1996
(86) PCT No.: PCT/DE96/01238
  § 371 Date: Apr. 2, 1998
  § 102(e) Date: Apr. 2, 1998
(87) PCT Pub. No.: WO97/04550
  PCT Pub. Date: Feb. 6, 1997

(30) Foreign Application Priority Data

Jul. 20, 1995 (DE) .............................................. 195 26 447

(51) Int. Cl.[7] ...................................................... H04L 7/00
(52) U.S. Cl. ......................... 375/372; 375/371; 375/373; 375/356
(58) Field of Search .................................... 375/371, 372, 375/373, 356; 714/762, 763; 380/272

(56) References Cited

U.S. PATENT DOCUMENTS

| 5,111,463 | * | 5/1992 | Zook ..................................... 714/762 |
| 5,452,333 | * | 9/1995 | Guo et al. ............................ 375/371 |
| 5,546,464 | * | 8/1996 | Raith et al. .......................... 380/272 |
| 5,784,390 | * | 7/1998 | Masiewicz et al. ................. 714/763 |

FOREIGN PATENT DOCUMENTS 195 11 147  10/1996 (DE) .
195 20 685  12/1996 (DE) .

OTHER PUBLICATIONS

European Standard, Specification of the Radio Data System (RDS) for VHF/FM Sound Broadcasting in the Frequency Range From 87.5 to 108.0 MHZ. Aug. 1996 (DIN EN 50067*).

* cited by examiner

Primary Examiner—Stephen Chin
Assistant Examiner—Shuwang Liu
(74) Attorney, Agent, or Firm—Kenyon & Kenyon

(57) ABSTRACT

A device for synchronization of a block counter in an RDS receiver, the decoder of which, after synchronization has been effected, is capable of performing an error correction in the received bits. The process steps which can lead to synchronization of the block counter are integrated into the process steps for error correction, and are repeated in each bit period.

8 Claims, 2 Drawing Sheets

SYSTEM FOR SYNCHRONIZING A BLOCK COUNTER IN A RADIO-DATA-SYSTEM (RDS) RECEIVER

FIELD OF THE INVENTION

The present invention relates to a device for synchronizing a block counter in a Radio Data System (RDS).

BACKGROUND INFORMATION

Methods for synchronization of a block counter in an RDS receiver are described in standard DIN EN 50 067, in which the radio data system (RDS) is also specified. The theory underlying synchronization of the block counter is set forth in Appendix C of the above-described DIN standard.

A device for synchronizing the block counter is described in German patent application No. P 195 11 147.8.

The operating principle of the decoder in an RDS receiver is described in Appendix B of DIN EN 50 067.

European patent application No. 0 491 084 describes an apparatus for generating synchronous signals for the block synchronization of block-coded data telegrams, in which offset words, superimposed at the transmitter end on the transferred data blocks, are used to synchronize a receiver to data blocks that have been sent. For this purpose, the offset data words superimposed on the transferred signal are determined in an offset word detector, and these data words are compared with offset data words generated in a logic arrangement. If the offset word detected and the expected one generated in the logic arrangement match, synchronization is present and a synchronization signal is output.

European patent application No. 0 292 966 describes an arrangement for receiving digital data in which the synchronization of the receiver is achieved using a predetermined bit pattern (i.e., a "unique data word") that is transferred. To improve the synchronization, even when there is a poor reception, an erroneous synchronization bit pattern can be corrected.

SUMMARY OF THE INVENTION

The present invention is advantageous in that the process steps for synchronizing of the block counter are integrated into the process steps in a specific decoder for decoding and optionally for correcting errors. Modules of the decoder can also be utilized for synchronizing of the block counter. The complexity for synchronization of the block counter and for decoding the data block can thus be considerably reduced. Additional advantages of the decoder described in German patent application No. P 1 95 20 685.1 are provided with the present invention.

Another embodiment of the present invention provides a smaller number of process steps in the decoder program.

A further embodiment of the present invention provides means for differentiating the decoder for the device according to the present invention from the conventional decoder.

DETAILED DESCRIPTION OF THE INVENTION

As described in standard DIN EN 50 067, at a transmitter end, a check data word is appended to the last information word of interest per se in the RDS receiver (consisting of sixteen bits). The check word is calculated from the information word and consists of ten bits. The information word and check word together constitute a data word. An offset word is also superimposed onto the check word in the transmitter. The offset word is determined from the position occupied by a data word within a data group, which is always constituted by four data words.

The same offset word is always associated with the first, second, and fourth data words within the data group, while one of two different offset words is used for the third data word.

In addition, in a specific data transfer, the differentiation of four data words within a data group is dispensed with, and the same offset word is superimposed on all the data words. Six different offset words are thus defined in the Radio Data System. As a result, on the one hand only the use of the six different offset words is permitted in the method according to the present invention, while on the other hand it must be possible for all six offset words to be generated by the offset word generator in the decoder for the method according to the present invention. Once the offset word has been superimposed, the term "data block," comprising twenty-six bits, is used.

Figure 1:
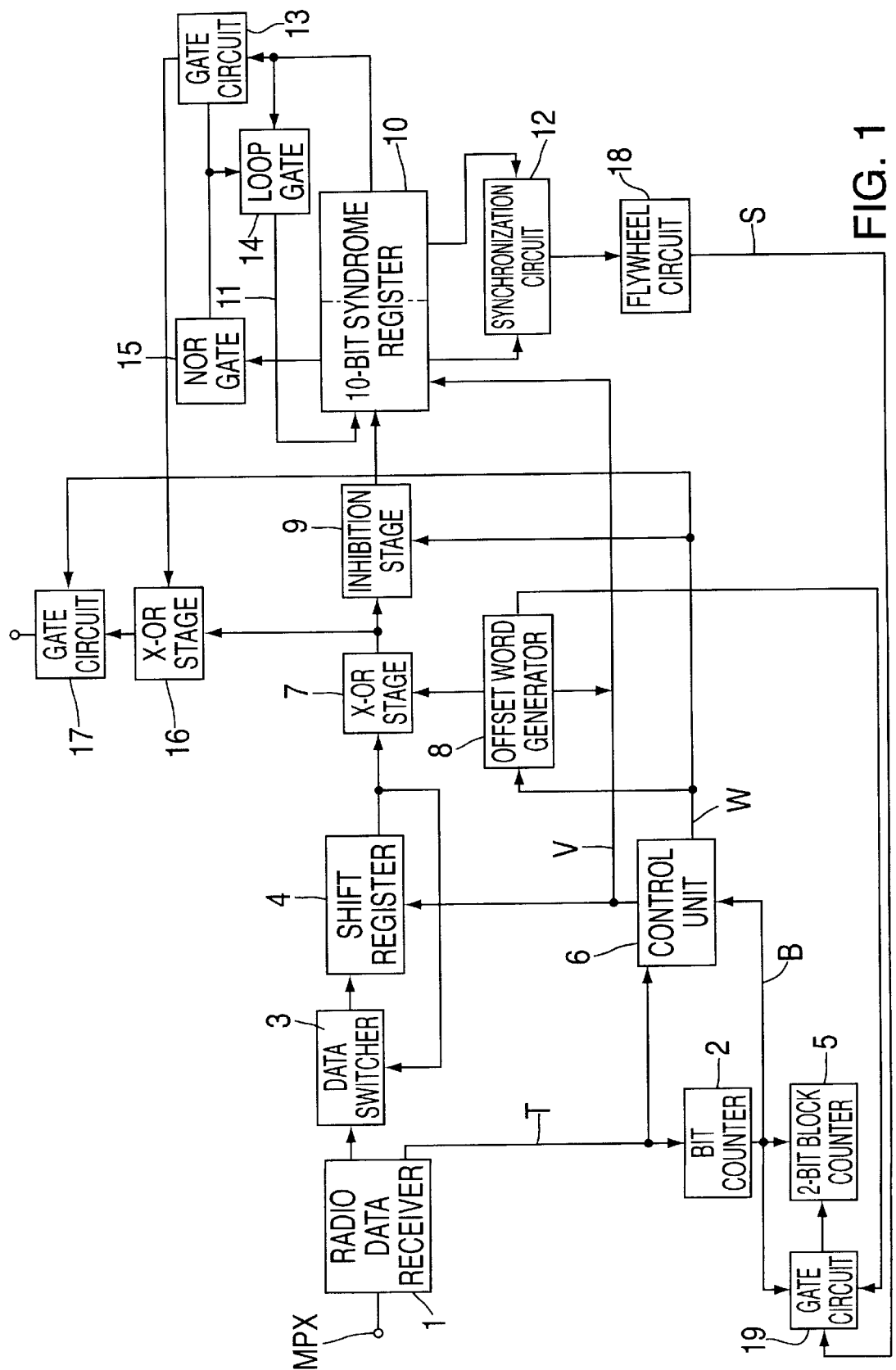
FIG. 1 shows a block diagram of a circuit arrangement according to the present invention for synchronizing a block counter and for decoding a data block.

The bits to be transmitted in the Radio Data System may become erroneous while traveling from the transmitter to the receiver. The Radio Data System makes it possible to correct as many as five bit errors in a data block if a complete data block was previously received in error-free manner one or more times, previously, and if it was possible, in that context, to synchronize the block counter in the RDS receiver. For synchronization, the beginning of a data block must be detected in the inherently infinite bitstream received by the RDS receiver. The arrangement for synchronization is shown in FIG. 1.

In each RDS receiver, a radio data receiver 1 is connected at the MPX signal output of the radio receiver section (not shown). A detailed diagram of the radio data receiver is not required to be illustrated, since a radio data receiver is described in standard DIN EN 50 067. The individual bits of the radio data, and the bit cycle, are regenerated in radio data receiver 1.

After the radio unit is switched on, the radio data receiver begins to output bit cycles, and bit counter 2 begins initially to count the number of bit cycles received via cycle line T.

The bits which are simultaneously regenerated in radio data receiver 1 are read in via a data switcher 3 into a 26-bit shift register 4, and are buffered there. After twenty-six bit cycles have been received, a block cycle is generated at output B of bit counter 2. Bit counter 2 is then automatically reset to zero. The number of block cycles is counted in a two-bit block counter 5. A group cycle can be picked off at the output of block counter 5 after every four block cycles. Block counter 5 is then also automatically reset to zero.

Within each group, a different state of block counter 5 is therefore associated with each data block.

The first bit received is not at the same time the first bit of a data block. The beginning of the next data block in the subsequent modules must therefore be determined before the data word can finally be output for further processing. The individual process steps are controlled by a control unit 6.

According to the an exemplary embodiment according to the present invention in FIG. 1, the output of shift register 4 is on the one hand sent back via data switcher 3, in its position II, to the input of shift register 4 so that the contents in shift register 4 can rotate. On the other hand, the output of shift register 4 is connected to the first input of a first X-OR stage 7. The second input of this X-OR stage 7 is connected to the output of an offset word generator 8.

The input of a 10-bit syndrome register 10 is connected, via an inhibition stage 9, to the output of first X-OR stage 7. In syndrome register 10, its ten memory cells are linked to one another via a logic loop 11 in order to calculate a syndrome value. The logic loop is extensively described Appendix B of standard DIN EN 50 067.

For synchronization, a synchronization circuit 12 is connected to syndrome register 10 and detects if a syndrome value of zero has been calculated in syndrome register 10. As soon as this syndrome value is detected, the essential prerequisite for synchronization of the block counter has been met. The synchronization is further illustrated in FIG. 2.

To decode a data block after synchronization, and if applicable for error correction, there is a gate circuit 13 in the output of syndrome register 10, and a loop gate 14 in the input of the logic loop, both of which are controlled by a NOR gate 15. The output of gate circuit 13 is connected to the second input of a second X-OR stage 16 whose first input is connected directly to the output of first X-OR stage 7. Gate circuit 17 after second X-OR stage 16 serves as output for the data words.

The prerequisites for an optional error correction capability are described in standard in DIN EN 50 067. The sequence in which an modules described above is described in modules just mentioned is explained in detail in the second-named earlier patent application P 1 95 20 685.1.

The data flow for synchronization of the block counter and for decoding of the data block and possible error correction in a data block branches only at the output side of syndrome register 10. The shared use for both operations of shift register 4, first X-OR element 7, offset word generator 8, and syndrome register 10 provide an essential characteristic of the method according to the present invention.

In the German patent application No. P 1 95 11 147.8, describes that in order to synchronize the block counter, a 26-bit shift register must be read out at least n times in each bit period, n being equal to the number of allowable offset words; that furthermore, at each readout operation, the data block read out of the shift register is linked in X-OR fashion with another of the n allowable offset words generated by offset word generator 8; and that the data word which is again available at the output of the X-OR stage is then read into a syndrome register, such that the syndrome of the data word is calculated and, as in the case of calculation of a syndrome value of zero, a synchronization of the block counter can take place.

In the German patent application No. P 1 95 20 685.1, describes that for error correction, in each last bit period of a data block a 26-bit shift register is read out twice, such that at each readout operation, the data block that is read out is linked in X-OR fashion with the same offset word; that at the first readout operation, the data word available after linking is read into a syndrome register and, upon reading in, the syndrome of the data word is calculated; and that at the second readout operation, the data word is output; the manner in which it is thereby optionally corrected is also set forth. The invention provides that synchronization of the block counter can be integrated into the method for error correction: shift register 4, offset word generator 8, first X-OR stage 7, and syndrome register 10 can be used in shared manner for synchronization and possible error correction if—shift register 4 (controlled by control unit 6) is read out 2 n times in each bit period, offset word generator 8 is advanced to generate the next offset word before the beginning of each odd-numbered readout operation, syndrome register 10 is erased, and the data word is read into the syndrome register only during each odd-numbered readout operation; and that further, a synchronization of the block counter is initiated at an odd-numbered readout operation if a syndrome of zero is calculated, while the data word is output at each even-numbered readout operation if a syndrome of zero is calculated, and otherwise an attempt at error correction is made.

Figure 2:
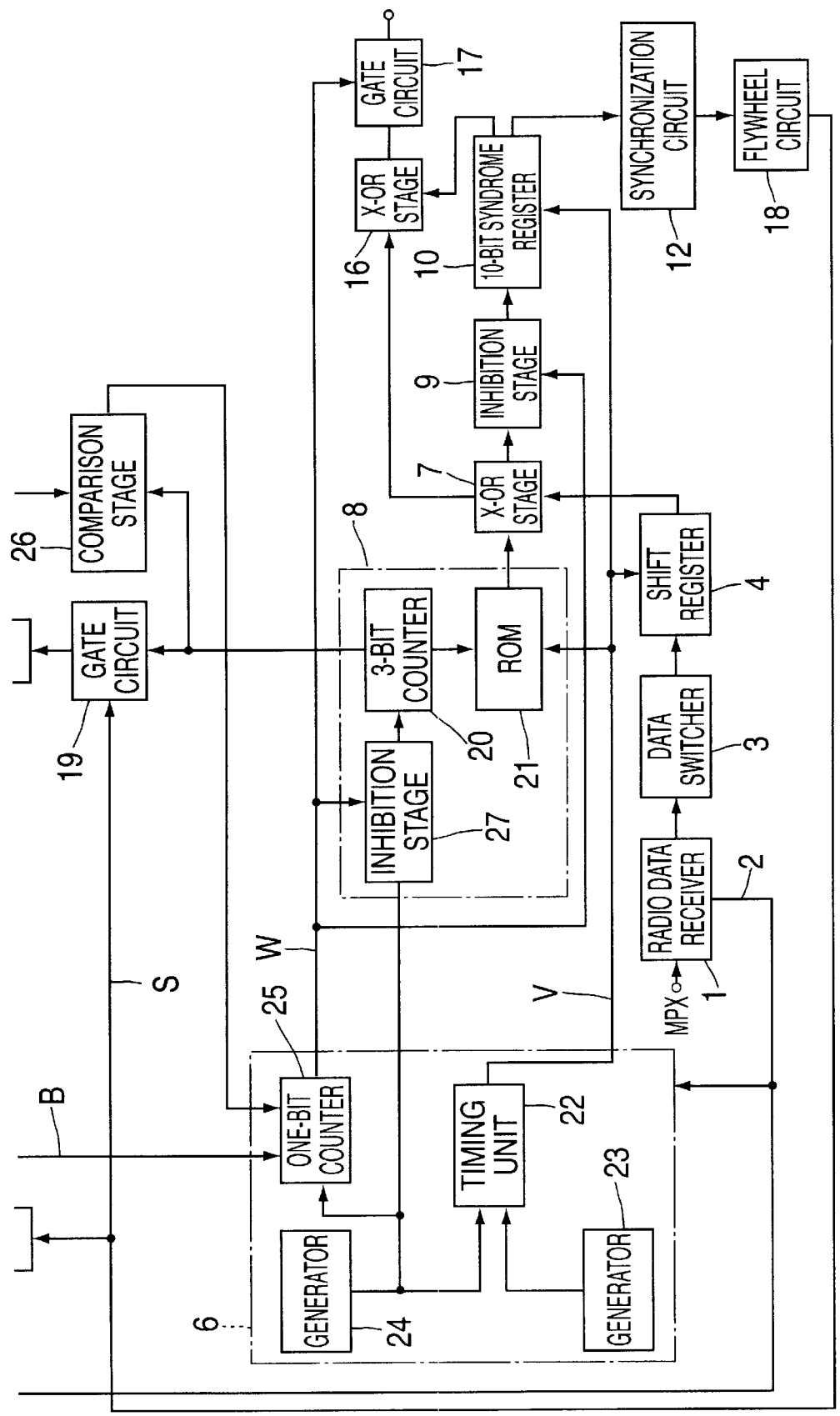
FIG. 2 shows a detailed diagram of a synchronization circuit according to the present invention.

Control unit 6 is described below with reference to FIG. 2. Since, according to the present invention shift register 4 is read out 2 n times each bit period, it is necessary—wherein n=6—to generate twelve packets of twenty-six shift pulses each on shift line V, which are generated in control unit 6. These shift pulses control both the reading out of shift register 4 and the reading out of a ROM 21 which serves as offset word generator 8, and they also time (10-bit) syndrome register 10.

The allowable offset words are stored in ROM 21 under defined addresses. With four allowable offset words, the addresses correspond to the numbers of the data blocks in the group; with a larger number of allowable offset words, the last two digits of the address match the block numbers.

In the exemplary embodiment, according to the present invention in which six allowable offset words are provided, a three-bit counter 20 requests the individual addresses sequentially as soon as three-bit counter 20 receives a respective incrementing pulse. In order to generate the shift pulses and other timing pulses, the control unit includes a timing unit 22, which is described in more detail in German patent application No. P 1 95 11 147.8. In the first exemplary embodiment of the method according to the present invention, the shift pulses in timing unit 22 are obtained from a first generator 23 whose frequency is 912 kHz, and that resetting of timing unit 22 is accomplished, after the output of each twenty-six shift pulses and any other timing pulses required, using the pulses of a second generator 24 whose frequency is 19 kHz and whose pulses optionally increment address (3-bit) counter 20 by one unit.

According to the present invention, a distinction can be made between an odd-numbered readout operation and an even-numbered readout operation, since the address counter is to be incremented by one unit only at an odd-numbered readout operation, so that the next offset word is called in each case from ROM 21; while at each even-numbered readout operation, the offset word must not be modified in order to output the data word or for error correction.

The distinction between odd-numbered and even-numbered readout operations is made using a one-bit counter 25 in the output of second generator 24, which in the even-numbered state, via repeat line W, blocks the incrementing input of address counter 20 via a second inhibition stage 27, and inhibits inhibition stage 9 in the input of syndrome register 10.

As described above, a synchronization signal occurs at the output of circuit stage 12 whenever, after syndrome calculation at the odd-numbered readout operation, a zero is stored both in the first five memory cells of syndrome register 10 (which stores ten bits) and in its second five bits. The synchronization signals are further analyzed in a flywheel circuit 18. Once the radio receiver has been switched on, the first synchronization signal then passes unchanged through flywheel circuit 18 and sets bit counter 2 to zero. As a result, a pulse appears at the output of bit counter 2 on block cycle line B. The synchronization signal on synchronization line S opens gate circuit 19, at which the status of the two lowest counting stages in three-bit address counter 20 in offset word generator 8 is transferred into block counter 5. Block counter 5 is thereby synchronized.

After synchronization at the odd-numbered readout operation, at the subsequent even-numbered readout operation the correct data word contained in shift register 4 is output via second X-OR stage 16 connected to first X-OR stage 7, and via gate circuit 17 controlled by repeat line W.

If the syndrome at an odd-numbered readout operation was not calculated as zero, the bits stored at the time in shift register 4 may still constitute a data block in which, however, individual bits have become erroneous during transmission. If an error bundle that may have occurred has a maximum length of five bits, the bit errors are still correctable if the block counter had been synchronized twenty-six bits earlier, i.e. at the previous data block, or provided flywheel circuit 18 is still indicating a synchronization run of the unit.

At the even-numbered readout operation for possible error correction, the bits stored in syndrome register 10 at the completion of syndrome calculation are recalculated by means of the logic loop. If a zero appears in each of the first (left-hand) five cells of syndrome register 10, the error correction can be accomplished using the further bits stored in syndrome register 10, as described in standard DIN EN 50 067, page 34.

In another embodiment of the method according to the present invention, shift register 4 is read out only (n+2) times in each bit period. For this purpose, shift pulses V are derived from a first generator 23 which oscillates at a frequency of 456 kHz, while generator 24 operates at a frequency of 9.6 kHz in order to reset timing unit 22. With this embodiment, an even-numbered readout operation is initiated within a bit period only if the status of the two lowest counting stages in address counter 20 matches the block counter status, and bit counter 2 remains at zero.

The comparison between block counter status and address counter status 15 is made in a comparison stage 26 which controls one-bit counter 25. If there is a match, and if bit counter 2 stands at the same time at zero, the next pulse of generator 24 is evaluated as an even-numbered pulse, i.e. an even-numbered readout operation is enabled. Thus, a control signal is provided to repeat line W for the duration of one readout cycle, inhibiting the two inhibition stages 9, 27 and enabling gate circuit 17. When the subsequent readout operation occurs, address counter 20 is then advanced again and inhibition stage 9 is opened. A match between the count status of address counter 20 and that of block counter 5 results upon synchronization of the block counter, which also occurs, in the non-synchronized state when bit counter 5 has a status determined arbitrarily. Since the address counter cycles through all the addresses once during a bit period, the address counter status also equals the accidental block counter status once in each bit period. Within a period, an accidental identity between block counter 5 and address counter 20 maybe identified first, and that at a subsequent readout cycle, block counter 5 maybe synchronized from address counter 20. The possibility that address counter 20 and block counter 5 will have the same status twice in one bit period determines the selection of (n+2) as the number of readout cycles, i.e. the selection of eight readout cycles and thus also the selection of 8 as the number of packets of shift pulses and therefore the selection of the frequencies indicated for generators 23 and 24.

It is necessary for the readout cycles to be distributed uniformly over a bit period. If the processors are sufficiently fast, it is also within the context of the present invention if the sum of the readout cycles requires only a fraction of a bit period, and the device is idle during the remainder of the bit period until the beginning of the next bit period.

What is claimed is:

1. A device for synchronizing a block counter in a Radio Data System (RDS) receiver, the RDS receiver including a program-controlled decoder, the device comprising:

a buffer memory receiving bits of a data block and serially storing the received bits of the data block;

a bit counter counting a number of the received bits, wherein, during a last bit period of the data block being stored, data is retrieved at least twice from the buffer memory as retrieved bits;

a first XOR stage serially linking the retrieved bits with further bits of an offset data word and generating XOR bits, the offset data word being generated in the program controlled decoder by an offset word generator, the offset word generator including an address counter, the address counter causing a generation of a next offset data word when an incrementing pulse is received by the address counter;

a syndrome register calculating a syndrome value and receiving the XOR bits in a first readout operation via an inhibition stage;

a second XOR stage coupled to an output of the first XOR stage, the second XOR stage receiving the XOR bits and being capable of performing an error correction operation in a second readout operation;

a first program-controlled arrangement reading the buffer memory at most 2 n times in each bit period, wherein n is equal to a number of allowable offset data words;

a second arrangement differentiating odd-numbered readout cycles from even-numbered readout cycles;

a third arrangement coupled to the syndrome register, the third arrangement providing a synchronizing signal when the syndrome value generated by the syndrome register equals zero, wherein, after the synchronizing signal is provided, the third arrangement sets the bit counter to zero and a block counter to a status of the address counter; and a fourth arrangement inhibiting an incrementing input of the address counter and an input of the syndrome register at each of the even-numbered readout cycles.

2. The device according to claim 1, further comprising:

a fifth arrangement reading the buffer memory n+2 times in each bit period; and a sixth arrangement inhibiting the incrementing input of the address counter and the input of the syndrome register within a bit period when the status of the address counter corresponds to a status of the block counter.

3. The device according to claim 1, further comprising:

a seventh arrangement reading the buffer memory n+2 times in each bit period; and an eighth arrangement inhibiting the incrementing input of the address counter and the input of the syndrome register within a bit period when the status of the block counter corresponds to two lowest counting stages of the address counter.

4. The device according to claim 3, further comprising:
a ninth arrangement reading the buffer memory eight times in each bit period; and
a tenth arrangement incrementing the address counter six times in each bit period.

5. The device according to claim 2, further comprising:
an seventh arrangement inhibiting the incrementing input of the address counter and the input of the syndrome register in a bit period when the bit counter equals to zero.

6. The device according to claim 3, further comprising:
an ninth arrangement inhibiting the incrementing input of the address counter and the input of the syndrome register in a bit period when the bit counter equals to zero.

7. The device according to claim 4, further comprising:
an eleventh arrangement inhibiting the incrementing input of the address counter and the input of the syndrome register in the bit period when the bit counter equals to zero.

8. A program-controlled decoder having a block counter, comprising:

a control unit including a timing unit, the timing unit including a first generator generating shift pulses and a second generator generating incrementing pulses;

a buffer memory for storing incoming bits;

a first XOR stage having a first input coupled to an output of the buffer memory and having a second input coupled to an output of an offset word generator, the offset word generator including an address counter to increment the offset word generator for generating a next offset data word;

a first inhibition stage coupled between an output of the first XOR stage and an input of a syndrome register;

a second inhibition stage coupled between an output of the second generator and an incrementing input of the address counter; and a one-bit counter counting the incrementing pulses of the second generator and, via a repeat line, blocking the first inhibition stage in the input of the syndrome register and the second inhibition stage during even-numbered generator pulses of the incrementing pulses.

* * * * *